No. 665,580. Patented Jan. 8, 1901.
J. P. PRICE.
CHURN DASHER.
(Application filed Oct. 4, 1900.)
(No Model.)
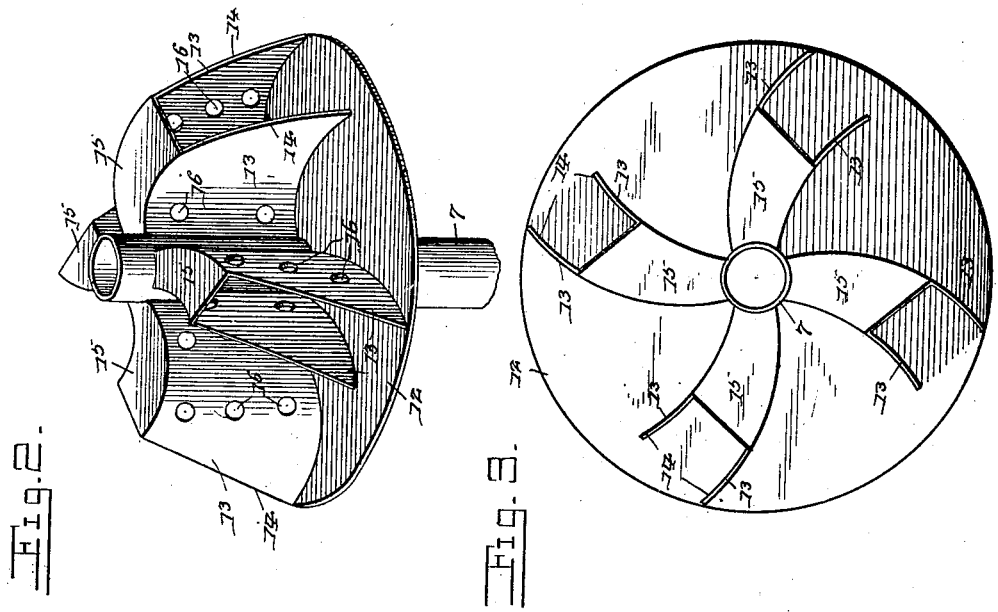
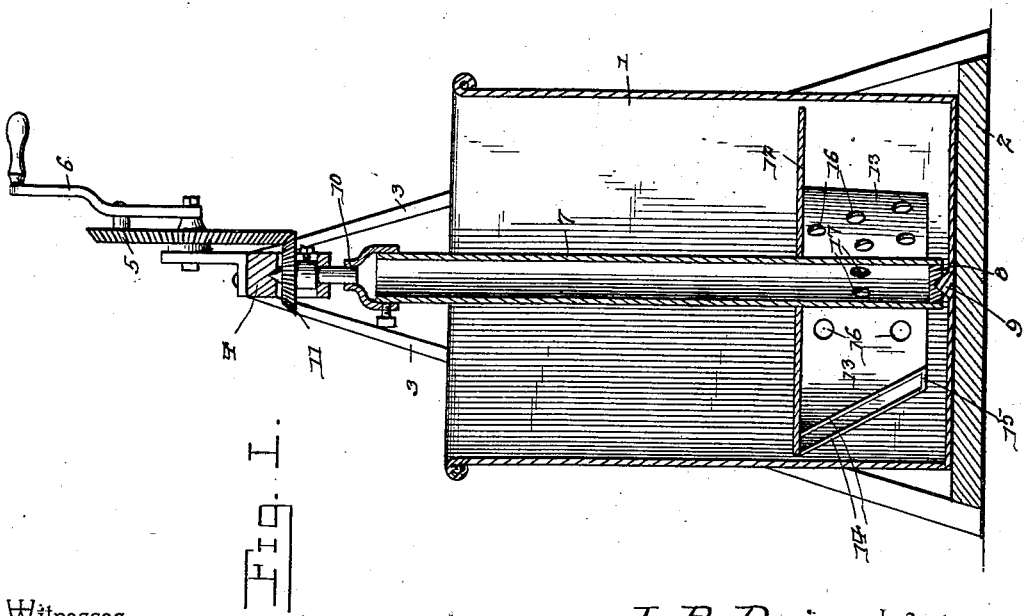
Witnesses
F. E. Alden.
O. P. Shepard.
J. P. Price Inventor
By C. A. Snow & Co.
Attorneys

UNITED STATES PATENT OFFICE.

JOHN P. PRICE, OF CLEARMONT, MISSOURI.

CHURN-DASHER.

SPECIFICATION forming part of Letters Patent No. 665,580, dated January 8, 1901.

Application filed October 4, 1900. Serial No. 32,042. (No model.)

*To all whom it may concern:*

Be it known that I, JOHN P. PRICE, a citizen of the United States, residing at Clearmont, in the county of Nodaway and State of Missouri, have invented a new and useful Churn-Dasher, of which the following is a specification.

This invention relates to churn-dashers, and has for its object to provide an improved rotary dasher for drawing air into the milk and to draw the cream into the center of the dasher, so as to compress and thoroughly agitate the same. It is furthermore designed to provide a simple and durable dasher which may be conveniently operated and readily cleansed.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a vertical central sectional view of a churn provided with the improved dasher. Fig. 2 is a detail inverted perspective view of the dasher. Fig. 3 is a bottom plan view thereof.

Corresponding parts are designated by like characters of reference in all of the figures of the drawings.

Referring to the drawings, 1 designates the body of the churn, which is supported upon a suitable base 2, having the uprights 3 at opposite ends thereof and connected above the top of the churn-body by a cross-bar 4. A vertically-disposed beveled gear 5 is mounted upon the middle portion of the cross-bar and is provided with a suitable crank-handle 6 for operating the dasher.

Located centrally within the churn-body is an upright tubular dasher-stem 7, which has its lower end closed by a wooden plug 8, the bottom of the latter having a socket for the reception of a conical projection 9, formed upon the bottom of the churn-body, and thereby providing a step-bearing for the stem. A suitable coupling 10 is provided upon the cross-bar 4 and connected to the upper end of the stem, the coupling also being driven from the gear 5 by means of an intermeshing gear 11, carried by the coupling.

A concentric disk or circular plate 12 is fixedly connected to the stem at a suitable distance above the lower end thereof, and pendent from this plate is a plurality of pairs of wings 13, which also radiate from the stem and are bowed in the same direction. The upper edge of each wing, which has a convex exterior, extends to the outer peripheral edge of the plate 12, and its outer edge 14 inclines inwardly and downwardly. Each other wing terminates short of the outer edge of the plate and has its outer edge inclined inwardly and downwardly and parallel with the adjacent wing. The lower edges of each pair of wings are connected by a bottom plate 15, so as to form a pocket, the opposite side walls of which diverge slightly outward from the stem. The several wings are provided with perforations 16, and the stem is also provided with perforations 17, which open into the respective pockets.

In the operation of the churn the dasher is caused to rotate with the open ends of the pockets in advance, so that the cream will be drawn into the pockets and toward the center of the dasher, thereby compressing the cream within the inner contracted ends of the pockets and forcing the same out through the perforated walls thereof. Also air is drawn downwardly through the hollow stem and directed into the pockets through the perforations in the stem. After the butter has begun to collect the dasher should be rotated in the opposite direction, so as to draw outwardly such particles of butter as may collect within the inner ends of the pockets.

What is claimed is—

1. A rotary churn-dasher, comprising a tubular stem, having radial pockets in communication with the interior of the stem, the side walls of the pockets being converged inwardly.

2. A rotary churn-dasher, comprising a tubular stem, a concentric plate secured to the stem and above the lower end thereof, and a series of radial pockets upon the under side of the plate, the outer ends of the pockets being open, and the stem having perforations located between the sides of the respective pockets.

3. A rotary churn-dasher, comprising a tubular stem having perforations, and a series of radial pockets, which embrace certain of the perforations and are also open at their outer ends, the opposite side walls of each pocket being of unequal lengths.

4. A rotary churn-dasher, comprising a tubular stem having perforations, and a series of radial pockets embracing respective perforations of the tube, and having open outer ends, the outer edges of the side walls of the pockets being inclined inwardly and downwardly.

5. A rotary churn-dasher, comprising a tubular stem having perforations adjacent to its lower end, a concentric plate connected to the stem and located above the perforations, pairs of radial and spiral wings pendent from the plate and connected to the stem, and also embracing respective perforations of the stem, the wings having outer convex sides extending to the outer margin of the plate, and the other wings terminating short of the marginal edge of the plate, bottom plates connecting the members of the respective pairs of wings and forming pockets, the sides of which converge inwardly and are perforated, and the outer edges of the wings being inclined inwardly and downwardly.

In testimony that I claim the foregoing as my own I have hereto affixed my signature in the presence of two witnesses.

JOHN P. PRICE.

Witnesses:
JOHN H. CLARY,
B. C. SOWERS.